Oct. 8, 1940.　　　　　L. V. LEWIS　　　　　2,216,820
REMOTE CONTROL SYSTEM
Filed April 17, 1937　　　3 Sheets-Sheet 1

INVENTOR
Lloyd V. Lewis.
BY
HIS ATTORNEY

Oct. 8, 1940.  L. V. LEWIS  2,216,820

REMOTE CONTROL SYSTEM

Filed April 17, 1937  3 Sheets-Sheet 2

INVENTOR
Lloyd V. Lewis.
BY
HIS ATTORNEY

Oct. 8, 1940.　　　　　L. V. LEWIS　　　　　2,216,820
REMOTE CONTROL SYSTEM
Filed April 17, 1937　　　　3 Sheets-Sheet 3

INVENTOR
Lloyd V. Lewis.
BY
HIS ATTORNEY

Patented Oct. 8, 1940

2,216,820

UNITED STATES PATENT OFFICE 2,216,820

REMOTE CONTROL SYSTEM

Lloyd V. Lewis, Pittsburgh, Pa., assignor to The Union Switch & Signal Company, Swissvale, Pa., a corporation of Pennsylvania Application April 17, 1937, Serial No. 137,500

16 Claims. (Cl. 177—353)

My invention relates generally to remote control systems, and more particularly to systems of the above character in which code signals are transmitted over a line which is relatively long electrically, such, for example, as a long distance cable line having considerable distributed capacity as well as resistance. More specifically, the invention relates to the method, as well as apparatus, for increasing the maximum length of such cable or other line over which code signals may be effectively transmitted and accurately reproduced.

My invention is particularly adapted for, though in no manner limited to, centralized traffic controlling systems for railroads employing a normally closed line circuit connecting a dispatcher's office with a plurality of field stations located at spaced points along the line. The code signals employed for transmission from the office to the stations and from the stations back to the office may be of any suitable character, but in the illustrative embodiments which I have chosen, these signals are formed by interrupting or varying the flow of current from a line battery which will usually be located at the dispatcher's office.

My present invention may advantageously be applied, for example, to centralized traffic controlling systems such as disclosed in my copending application, Serial No. 600,786, filed March 23, 1932, which corresponds with British Patent No. 415,787, issued September 3, 1934, and one object of my invention is to extend the effective length of the territory controlled by such systems. It will be understood, however, that the method and apparatus embodying my invention, though explained with reference to a railway traffic controlling system of the above type for a clearer understanding of the invention, are of general utility in signal transmission systems and may be employed wherever suitable current impulses must be effectively transmitted over an electrically long transmission line.

Other objects and features of my invention will become apparent as the description progresses.

I shall describe several methods and forms of apparatus embodying my invention, and shall then point out the novel features thereof in claims.

In the accompanying drawings,

Fig. 1b is a diagrammatic view embodying my invention showing a modification of the office equipment of Fig. 1a.

Fig. 4 is a diagrammatic view embodying my invention showing a modification of the equipment at any one of the field stations of Fig. 1a.

Similar reference characters refer to similar parts in each of the several views.

The designations for the various relays disclosed herein are the same as for the corresponding relays shown in my copending application, Serial No. 600,786, hereinbefore referred to, which corresponds with British Patent No. 415,787, issued September 3, 1934 as these relays are provided for the same purpose and perform similar functions to those described in said copending application and said patent. That is, the reference R designates the receiving line relay, and is identified by the prefix O when located at the control office or by a numerical prefix corresponding to the station number when located at a particular field station. The reference T, with corresponding prefix, similarly designates the corresponding transmitter relay for delivering code impulses to the line circuit, while M designates the master relay which controls the transmission and which is energized only when a code is being transmitted from the corresponding station.

Figure 1A:
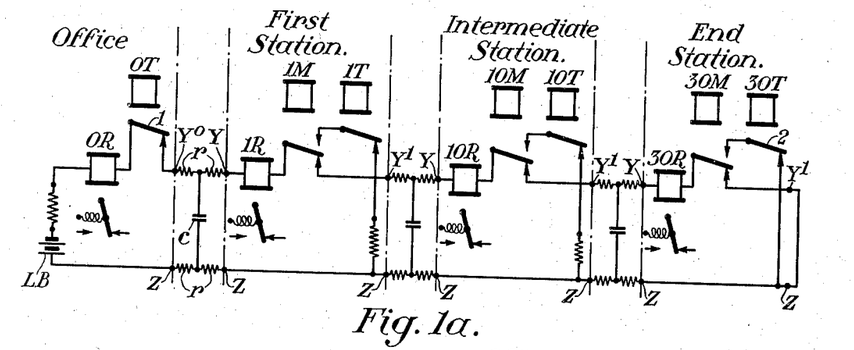
Fig. 1a illustrates a simple form of transmission line circuit suitable for centralized traffic control which circuit is used for providing a general explanation of the invention.

Referring now to Fig. 1a, this figure illustrates the line circuit for a system such as shown in my copending application hereinbefore referred to, and is similar to Fig. 10 of said application except that series resistances $r$ and shunt condensers $c$ have been added as indicative of the characteristics of a long cable line. Also, the line relays R shown in Fig. 1a are illustrated as of the biased polar type, relays of this type being preferably used in accordance with the present invention, instead of the usual neutral relays as shown in Fig. 10 of said copending application.

Figure 2A:
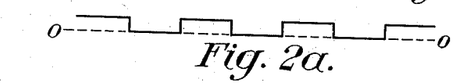
Figs. 2a to 2h, inclusive, illustrate the wave form of the voltage and current in the transmission line of Fig. 1a at different points of the line and under different conditions of transmission.
Figure 2B:
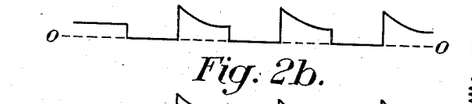

In systems of this character, the code signals are formed by opening and closing the line circuit at time spaced intervals, and the line current variations in a short line due to the operation of any of the transmitting relays T correspond in form to the variations of the impressed voltage and therefore are of the general form indicated in Fig. 2a. Actually one or more relatively long impulses and/or intervals are interposed in the series of impulses to characterize the code, but these being of a lower fundamental frequency are transmitted more readily, and for simplicity only a series of short impulses is shown. In a long cable line, considering particularly the operation of the office transmitter OT of Fig. 1a, a transient current flows into the cable to charge the distributed capacity of the cable each time the line is closed, as indicated in Fig. 2b, and this charge leaks off at the remote end in whole or in part when the line is opened. Considering now the voltage diagram of Fig. 3, the height EO in this diagram represents the voltage across the closed line at the office end, and it is obvious that when a steady current is flowing in the line this voltage decreases uniformly to zero at the distant end, as indicated by the line $EO^1$, since the distant end of the line is closed. The charge at any point along the line is proportional to the voltage at that point, and it will be clear that the total charge is $\tfrac{1}{2}CE$ where C is the total cable capacity and E is the voltage applied at the sending end. The effect is substantially as if the entire charge were located at the center of gravity of the triangle $EO^1O$, that is, at a point $O^2$ which is one-third of the distance from O to $O^1$.

Figures 2D, 2E, 2F:
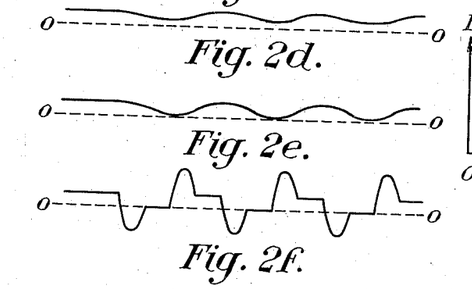
Figure 3:
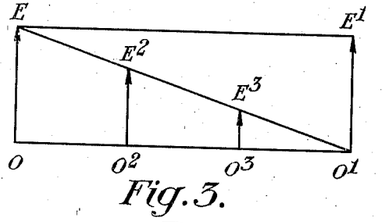
Fig. 3 is an explanatory diagram showing the voltage distribution along the line.

That distortion of signals results from the presence of distributed capacity $c$, due to the opening and closing of the line circuit at the battery end, will be at once apparent because, when the line becomes closed, the capacity is charged through a resistance proportional to the distance $OO^2$ in Fig. 3, and when the line becomes opened, it discharges through a resistance proportional to the distance $O^2O^1$ which is twice as great so that the rates of charge and discharge are not the same. The current received at the distant end of the line will therefore be non-symmetrical in wave form, being of the general form indicated in Fig. 2d. Moreover, the current delivered to the line at the transmitting end will also be non-symmetrical in form, as will be obvious from an inspection of Fig. 2b.

Figure 1B:
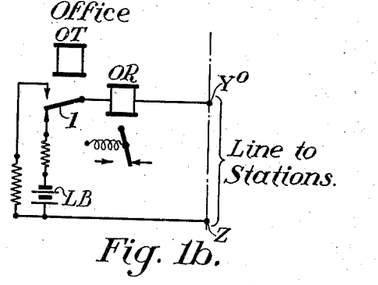

This distortion may be overcome to a considerable extent by short-circuiting the line through a front point on contact 1 of relay OT when the battery LB is disconnected. Fig. 1b shows apparatus for performing this function, and this apparatus results in the production of signals of the general form shown in Figs. 2c, at the transmitting end of the line, which signals are not only symmetrical but result in the delivery of much stronger impulses, such as are shown in Fig. 2e, to the distant end of the line. This is because of the greater overall variation in the current supplied at the transmitting end, as will be clear from the diagrams. The office apparatus of Fig. 1b may be substituted for the office apparatus of Fig. 1a by connecting to the line circuit at $Y^0$ and Z.

It will be seen that the discharge current which flows through front contact 1 of relay OT when the modification of Fig. 1b is applied to Fig. 1a, also flows through relay OR, Fig. 1b, as well as through relay 1R, Fig. 1a, and the other line relays near the office end of the line, but the flow of this discharge current is in the opposite direction to that occurring when battery LB is connected to the line. Moreover, this opposed current flow occurs at a time when the above relays should be released. It is because of this condition that all of the line relays in this modification of my apparatus are made of the biased polar type instead of the usual neutral type, in order that these relays may not be affected by reverse currents and in order that the cable discharge currents will merely retain these relays in their released position.

Considering now the transmission from a field station to the office, and more particularly from the end station of Fig. 1a, it will be found that the opening and closing of the line by the transmitting relay 3OT will also produce a line current variation at that end corresponding to the general form shown in Fig. 2b. It will be understood, of course, that the master relay 3OM will first become closed by the operation of suitable apparatus (not shown) prior to the transmission of a code from the end station. In this case, when the line is opened, current continues to flow to charge the entire line to a potential E as indicated by the line $EE^1$ in Fig. 3, and the larger part of the charge represented by the triangle $EE^1O^1$ leaks off when the line becomes closed. In this case, the charge on the line is $\tfrac{1}{2}CE$ when the line is closed and equals twice that value or CE when the line is open, and the effect is substantially as if the entire distributed capacity were concentrated at a point $O^3$, one-third of the distance from the end station to the office. Transmitter 3OT at the distant end, therefore, delivers non-symmetrical signals at the office, which signals are of the same form as those delivered at the end station when the office transmitter is operating and the cable discharge circuit is not used. That is, the signals delivered by relay 3OT are in accordance with Fig. 2b and those received by relay OR are in accordance with Fig. 2d.

Figure 2C:
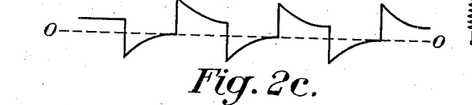
Figure 4:
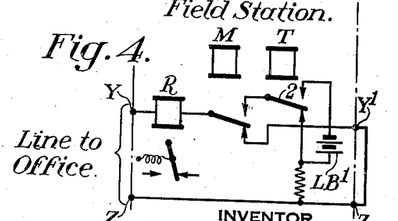

One important feature of the present invention resides in the provision of means for charging the cable principally from the end remote from the line battery, when transmitting from that end, in order that the signals which are delivered to the line by the operation of the different field station transmitters may have the form shown in Fig. 2c of the drawing, to correspond with those delivered by the office transmitter of Fig. 1b. In Fig. 4 I have shown one way in which this result may be obtained. In this figure, an auxiliary line battery LB¹ is shown connected to the line over a front contact 2 of the transmitting relay T at the station, which may be either one of the intermediate field stations, as shown, or the end station. The apparatus of Fig. 4 may be substituted for the end station apparatus of Fig. 1a by connecting to the line circuit at Y and Z, or it may be substituted for the apparatus of any intermediate station by making obvious connections with the line circuit at Y—Z and Y¹—Z. If this battery LB¹ is inserted into the circuit of Fig. 1a at the end station and if it has the same voltage as battery LB at the office, it will supply a similar charging current to that of battery LB to charge the line to a voltage E at the distant or office end, and this charging current flowing through the line relays 3OR, IR, etc. will be without effect on their operation due to the polar characteristics of these relays. The overall variation in current will thus be increased through the use of battery LB¹ so that strong signals of the form indicated in Fig. 2e will be delivered to the relay OR. In this figure, as in Fig. 1a and all of the remaining figures which show a master relay OM, 1OM, 3OM, etc., it is understood that this relay will be picked up by suitable apparatus forming no part of my present invention prior to the transmission of a code from that location.

Fig. 4 is largely illustrative of the principles involved, and in practice, it is unnecessary, and may even be undesirable, to provide an additional line battery with the accompanying charging equipment therefor at each field station. One method by which a suitable charging voltage O¹E¹ may be delivered to the line by relatively simple apparatus is that indicated in Fig. 5.

In order to simplify the disclosure, wherever a local battery is employed in any of the circuits illustrated in the drawings, the presence of the battery is indicated conveniently by means of the reference characters B—C which designate the respective terminals of the battery.

Figure 5:
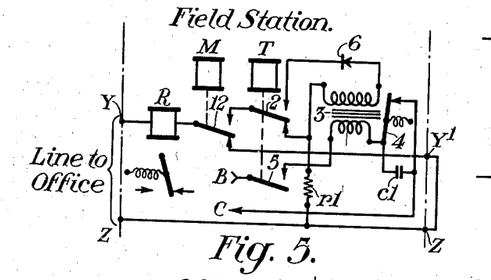
Figs. 5, 6, and 7, are diagrammatic views showing modified forms of the apparatus of Fig. 4 and each embodying my invention.

Referring to Fig. 5, there is shown in this figure an induction coil of the usual and well-known type comprising a step-up transformer 3 having a vibrator contact 4 shunted by a condenser c1 to prevent arcing at the contact. The transformer 3 has its primary energized over a front contact 5 of the transmitting relay T from a local low voltage station battery having the terminals B—C, and has its secondary connected to the line over a front contact 2 of the same relay. The secondary circuit of transformer 3 includes a rectifier 6 connected in such a direction as to permit charging current to be freely supplied to the line in a direction opposite to that of the current due to the office line battery, but to prevent an appreciable flow of current through the secondary winding in the opposite direction. When the transmitting relay T picks up, energy from a local source of unidirectional current B—C is connected over front contact 5 of relay T and the spring-biased vibrator contact 4 to the primary winding of the induction coil. The operation of the induction coil from this point on will be obvious without further explanation.

In transmitting, suitable apparatus which forms no part of my present invention and which is not necessary for an understanding of the invention, causes relay M to pick up and to energize relay T so as to open the circuit of the office line battery to transmit an "off" impulse. This "off" impulse is aided by the opposing voltage from induction coil 3 which is impressed on the line over front contact 2 of relay T and front contact 12 of relay M. The release of relay T, caused by the operation of transmitting apparatus which forms no part of my present invention and is therefore not shown in the drawings, results in the closing of back contact 2 of relay T to shunt the line over the compensating resistor r1, and thus forms the "on" impulse of the code. The magnitude of the compensating resistor r1 depends upon the particular location of the transmitting station with respect to the office and compensates for the resistance of the line beyond that station, in order that the line current may remain substantially constant irrespective of which station happens to be transmitting.

The voltage delivered by the apparatus of Fig. 5 obviously does not need to match the voltage of battery LB exactly, and the effect will be advantageous even if the voltage delivered by the induction coil is sensibly lower or higher than that of the battery. If the delivered voltage is lower than that of the battery, the rectifier will block the flow of current from the battery LB, while if the voltage is higher than that of the battery, the excess reverse current is without adverse effect on the operation of the line relays because of the polar characteristics of these relays.

Figure 6:
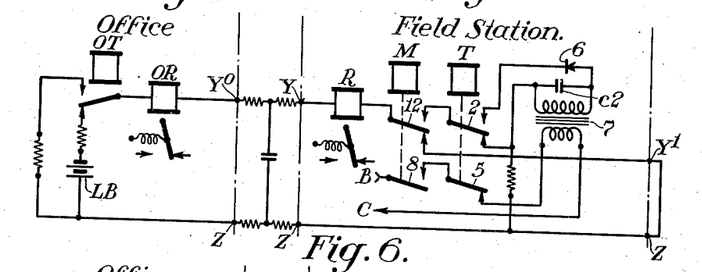

Since in many cases the total energy required to charge the line is very low and may, for example, be but a fraction of a watt, this energy, if desired, may be supplied in a single impulse by apparatus such as I have shown in Fig. 6. In this embodiment of the invention, a transformer 7 has its primary connected over a back contact 5 of relay T, as well as a front contact 8 of relay M, to the local source of unidirectional current having the terminals B—C. The secondary of transformer 7 is connected to the line through a rectifier 6 and front contacts 2 and 12 of relays T and M, as in Fig. 5. A condenser c2 is connected across the secondary winding of transformer 7 for the purpose of storing the impulse energy so as to avoid the necessity for perfect timing of the opening of back contacts 5 and 2 of relay T, and to prevent sparking at these contacts. The apparatus of Fig. 6 is so arranged that a single reverse current impulse is delivered to the line each time relay T picks up, for the purpose described. The office portion of Fig. 6 is similar to Fig. 1b, and it will be clear therefore, that in this form of the apparatus symmetrical signals of the form of Fig. 2c will be delivered to a long cable line circuit when either the office or a field station is transmitting.

The signals received at the distant end in each case will be symmetrical and of the form indicated in Fig. 2e, and these signals will be relatively strong in comparison with those delivered to a similar line by the apparatus of Fig. 1a.

Figure 7:
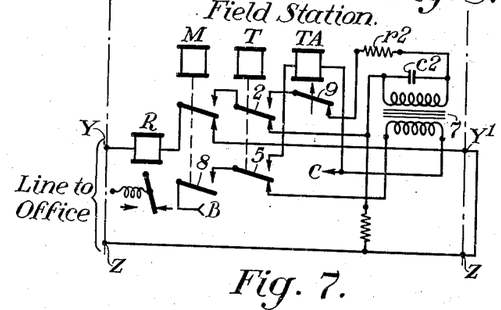

In Fig. 7 I have shown another modification which may be used for a similar purpose. In this figure, the rectifier 6 is omitted and its function is performed by the repeater relay TA which opens the output circuit of the impulse transformer at the proper time to prevent a reverse flow of line current through the secondary winding, as will be clear from the drawing. The condenser c2 across the secondary winding performs the same function as that performed by the corresponding condenser in Fig. 6. Obviously, it is not essential that the condenser be connected across the secondary winding as a similar effect may be obtained by connecting a suitable condenser across the primary winding of the impulse transformer. The protective resistor $r2$ is inserted in the output circuit of the impulse transformer to prevent undesired discharge of the line in the event that relay TA should fail to operate for any reason and its back contact 9 fail to open. Furthermore, relay TA may be omitted provided resistance $r2$ is made high enough to prevent the pick up of the line relays when front contact 2 is closed, the voltage delivered by transformer 7 in this case being increased to correspond to the increase in the value of $r2$.

Heretofore, one limitation upon the distance of transmission over a circuit of the type illustrated in Fig. 1a has been the effect of the time constant of the line in the event that the office and a distant station start transmitting simultaneously. This condition may occur, for example, in the operation of a system such as described in my copending application, Serial No. 600,786, previously referred to. Thus, in Fig. 1a, when back contact 2 of relay 3OT opens, an appreciable time will elapse before the effect of its opening becomes manifested at the office. In fact, if the line is long enough, contact 2 may close again before the effect of its opening has been registered at the office. By reference to Fig. 3, it will be clear that this delay is due to the necessity for charging the line through a resistance corresponding to the distance OO3 before relay OR will release. When apparatus such as that shown in Fig. 4, 5, 6, or 7 is provided, however, the battery LB is required to supply only a portion of the total charge corresponding to or less than the portion EE3 of the upper triangle, instead of the entire charge, and the time constant of the circuit, as measured at the office end, is accordingly greatly reduced. This factor quite obviously makes it possible to extend the maximum distance of transmission by a very substantial amount.

Considering again the curves of received current shown in Figs. 2d and 2e, it will be apparent that the wave form differs considerably from that of the current received over a short line, as indicated in Fig. 2a. Nevertheless, when the line relays are supplied with current having a relatively slow rate of change the line relay contacts will deliver undistorted code signals of the general form shown in Fig. 2a, provided that the A. C. component of the line current is symmetrical, as in Fig. 2e, and provided further that the neutral axis of this current (which equals the D. C. component or average value of the line current) corresponds to the mean value of the pick-up and release values of current for the receiving relays, as determined by their bias adjustment. It is also apparent that a change in the timing of the signals delivered by the contacts of the line relays will occur when the average value of the line current becomes either greater or less than the particular value mentioned.

This effect may be decreased and improved transmission may be obtained by increasing the current delivered to the line by impressing impulses of alternately opposite polarity upon the line so that the total voltage impressed on the line will be of the form shown in curve 2f of the drawing. In such case, the rate of change of the current received at the distant end will be increased and the received signals will correspondingly be changed from the form shown in Fig. 2e to the form shown in Fig. 2g.

Figure 8:
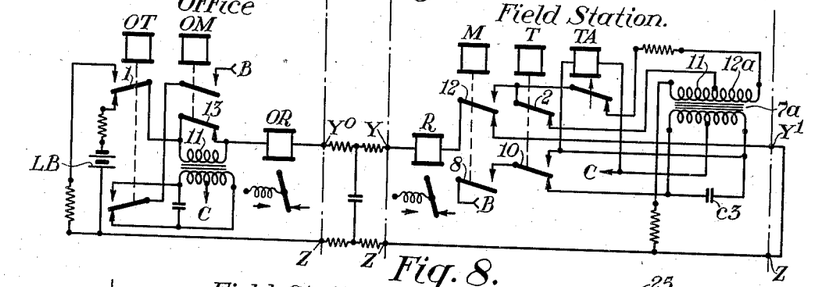
Fig. 8 is a diagrammatic view showing apparatus embodying my invention by means of which impulses of alternately opposite polarity may be impressed upon the line either at a distant field station or at the office, or both, to improve the transmission characteristics of the line.

One form of apparatus for delivering signals of the form illustrated in Fig. 2f to the line circuit is shown in the right-hand or field station portion of Fig. 8. This apparatus comprises an impulse transformer 7a having a periodically reversed E. M. F. impressed on its primary by a contact finger 10 of relay T when a field station is transmitting. As a result, when relay T picks up, a reverse E. M. F. is impressed on the line circuit by the full secondary winding comprising winding portions 11 and 12a. Portion 12a of the secondary winding corresponds with the output winding of the impulse transformer in Fig. 7 and functions to correct the wave form in a similar manner to that of the apparatus of Fig. 7. Portion 11 of the winding is included in the line circuit both when relay T picks up and when it releases, as is apparent from the drawing, and so delivers symmetrical impulses of alternately opposite polarity as indicated by Fig. 2f. The current delivered to the line will therefore be of the symmetrical form indicated in Fig. 2c, but of a higher peak value than that delivered by the field station apparatus of Fig. 6. The condenser $c3$ is connected across the input winding of transformer 7a for a purpose similar to that performed by condensers $c2$ in Figs. 6 and 7.

In the left-hand or office portion of Fig. 8, an alternating impulse voltage is also applied to the line when the office transmitter OT is operating by apparatus similar to that at the field station of Fig. 8, except that the additional secondary portion 12a is not required. Back contact 13 of relay OM at the office and back contact 12 of relay M at the station operate in an obvious manner to cut the impulse transformer secondary out of the line circuit, except during the transmission of a code, so that the added apparatus is without effect upon reception of a code from a distant point.

Figure 9:
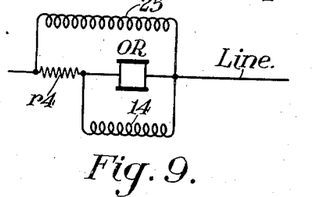
Figs. 9, 10, and 11 are diagrammatic views showing corrective circuits embodying my invention by means of which the operation of the apparatus illustrated in any of the preceding figures may be improved.

The form of the received signals provided by the apparatus of any of the preceding views may be still further improved by the use of a corrective network or circuit equalizer at the receiving station so designed as to increase the rate of change of the current delivered to the line relays. One way in which this may be accomplished is by shunting the line relay by relatively high inductances such as the inductances 14 and 25 shown in Fig. 9. In this figure, it is evident that the line current, which may be assumed to be of the form of Fig. 2e, is divided into two components, one of which passes through the resistance $r4$ and the other through the inductance 25. The rate of change of the component passing through the inductance will be less than the rate of change of the total line current, and it follows, therefore, that the rate of change of the component passing through resistor $r4$ will be correspondingly greater than that of the total line current. Similarly, the current through resistance $r4$ divides into two components, the rate of change of the component passing through inductance 14 being less and that of that passing through relay OR being greater than that of the current through resistance $r4$. In this case relay OR is wound to a relatively high resistance so as to operate on a smaller current, since it receives but a portion of the total line current.

Figure 10:
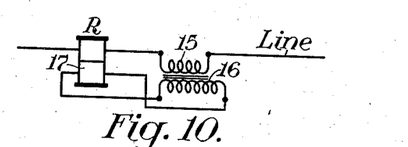

Fig. 10 shows another form of corrective network in which a step-up transformer having a primary 15 is placed in series with the line relay. The secondary 16 of this transformer will deliver a voltage proportional to the rate of change of the line current but of amplified value in comparison with the reactance voltage across primary 15, and this amplified voltage is impressed across an auxiliary winding 17 of the line relay R to accelerate the response of this relay.

Figure 11:
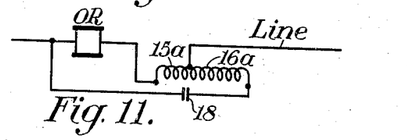

An arrangement which is the equivalent of that of Fig. 10 may also be secured by the apparatus of Fig. 11 in which an amplified output voltage from the autotransformer secondary 16a is delivered to relay R through a relatively large series condenser 18.

Figure 12:
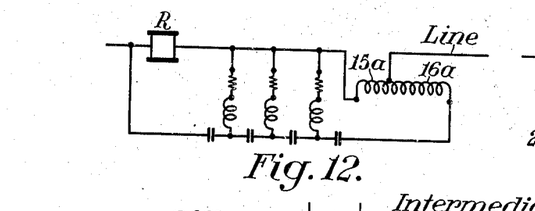
Fig. 12 is a diagrammatic view showing a filter applied to the corrective circuit of Fig. 11, and also embodying my invention.

The effect produced by the arrangement of Fig. 11 may be further improved by interposing a "high-pass" filter between the output winding 16a and relay R, as shown in Fig. 12. Corrective networks or circuit equalizers of this form and methods for determining their constants are well known in the telephone and telegraph arts and need not be described in detail. It will be sufficient for the purposes of my present invention to state that if, in Fig. 12, each series condenser is made equivalent to the shunt capacity of a corresponding section of the line, and if each shunt impedance is made equivalent to the series impedance of such line section, the line plus the equalizer will offer a constant resistance to all frequencies, so that the current delivered to the receiving relay will be of the same form as the impressed voltage. That is, received signals of the form of Fig. 2d or 2e may be so modified by a circuit network that the signals delivered to the receiving relay will be substantially of the form indicated in Fig. 2g or 2a. In such case, the operation of the receiving relay will be largely independent of the value of battery voltage.

The apparatus so far described is concerned chiefly with the correction of the distortion of signals in a long cable line due to the characteristics of the line circuit itself. In addition to such distortion, there is also a distortion resulting from the operation of the line relays, as will become apparent from the following discussion. Each receiving relay in the line circuit is an energy consuming device, or motor, and also possesses reactance. Each relay, therefore, generates a counter-electromotive force in the line circuit when the relay operates, in such a direction as to oppose the change in the line current which is the cause of the relay operation. In other words, each line relay upon picking up tends to prevent the other relays from picking up, and each line relay upon releasing tends, likewise, to prevent the other relays from releasing.

To decrease this effect in practice, it is customary, even in the case of a short line, to use relays of relatively low resistance so that the total relay resistance included in the line circuit is not more than one-half of the total resistance of the circuit. This measure is, however, insufficient when the line is so long that the rate of change of the line current is relatively low, in which case a slight decrease or increase in the rate of change causes a relatively large change in the time of operation. This effect will be readily apparent from an inspection of Fig. 2 of the drawings. For example, if the received current at the end of a long line having no relays included therein may be assumed to be of the form of Fig. 2e, then the counter-electromotive force due to the inclusion of several line relays in the line circuit may change the wave form to that indicated in Fig. 2h in which the irregularities are due to the pick-up and release operations of the line relays.

To overcome this difficulty, I propose to cause each line relay, when it operates, to introduce a voltage impulse into the line circuit in a direction such as to oppose and overcome the effect of its own counter-electromotive force upon the line circuit. One form of apparatus for accomplishing this result is that shown in Fig. 13. The apparatus of this figure includes an impulse transformer having a secondary 15 in series with the line and a primary 19 supplied with impulses which are periodically reversed in direction by connection alternately to the contact 20a or 20b of the line relay R. The apparatus of Fig. 13 functions in a manner generally similar to that of the office portion of Fig. 8 already described, since relay R of Fig. 13 is controlled by and is therefore a repeater of the transmitting relay OT which provides the impulses in Fig. 8.

Figure 2G:
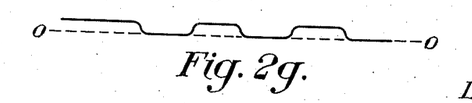
Figure 2H:
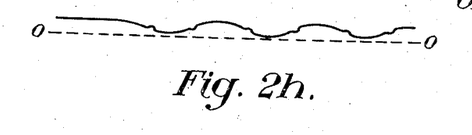
Figure 13:
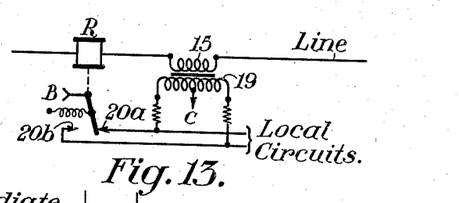
Figs. 13 and 14 are diagrammatic views, both embodying my invention, showing other means for correcting the distortion in the line current.

The apparatus of Fig. 13 may be used not only to compensate for the effect of the operation of the relays but may also be used to provide an additional voltage to change signals of the form of Fig. 2a to that of Fig. 2f, which results in a change of received signals of the form of Fig. 2e to that of the form of Fig. 2g, and the effect of the additional voltage provided by the apparatus of Fig. 13 will then be to increase the rate of change of the line current, as in the case of Fig. 8.

The effect which the apparatus of Fig. 13 has upon the line current differs in one respect from that of the office apparatus of Fig. 8 in that the added voltage impulse is delayed slightly with respect to the transmitter and so follows rather than precedes the operation of the adjacent line relay. Accordingly, with a plurality of line relays, a corresponding plurality of overlapping impulses will be produced differing slightly in time phase. It follows that the energy of the individual impulses may, therefore, be relatively small as compared with the energy of the impulses delivered by the transmitting relay at the office or at the field station of Fig. 8. The apparatus of Fig. 13 possesses the advantage, therefore, that the distortion correcting means is distributed along the line, whereby the total effect may be made as great as desired even though the effect of each individual impulse transformer may be relatively small. The cumulative effect of the impulses, such as are produced by the apparatus of Fig. 13, is obviously to accelerate the charge and discharge of the line capacity as in the other forms of the apparatus previously described.

Figure 14:
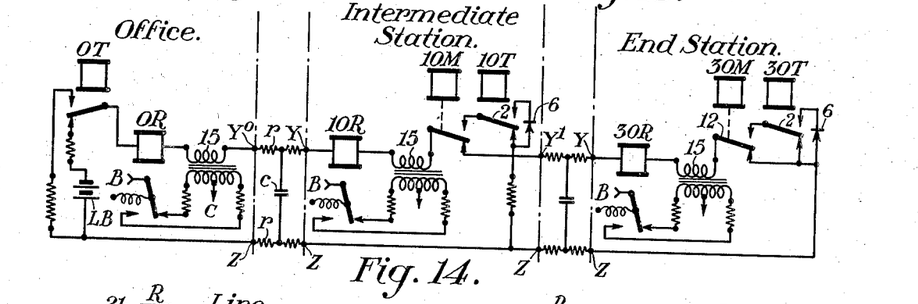

Fig. 14 illustrates a line circuit similar to that shown in Fig. 1a but arranged to include apparatus in accordance with Fig. 13. A rectifier 6 is included in the branch circuit passing over front contact 2 of each station transmitting relay T for the same purpose as described in conjunction with the apparatus of Figs. 5 and 6, namely, to provide a low resistance path for charging the capacity of the line from the end remote from the battery LB. Thus, in Fig. 14, when back contact 2 of relay 3OT opens (front contact 12 of relay 3OM having previously become closed in the normal operation of the system), the total voltage impressed on the line by the secondaries 15 of the impulse transformers may be represented by the vector $O^1E^1$ of Fig. 3, while the vector OE may be taken to represent the total voltage impressed on the line by the line battery LB and the impulse transformers when back contact 2 of relay 3OT subsequently closes.

Figure 15:
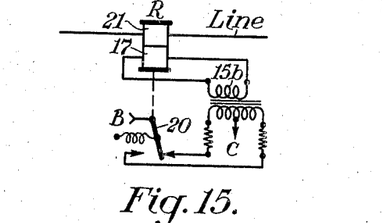
Figs. 15 and 16 are diagrammatic views, both embodying my invention, showing additional means for overcoming the effect of distortion in the line current upon the line relays.

Fig. 15 illustrates a modified form of the invention of Fig. 13 in which the line relay R is provided with an auxiliary winding 17, as in Fig. 10, across which winding the transformer secondary 15b is connected. The connections are so arranged with respect to polarity that when contact 20 moves to the left an impulse is produced in winding 15b tending to accelerate the motion of the contact to the left, and when contact 20 moves to the right, an impulse is produced to accelerate the movement to the right. The effect upon relay R is, therefore, the same as if the impulse traversed its line winding 21, as in Fig. 13, and since the two relay windings are coupled together magnetically and so constitute a transformer, a voltage is impressed upon the line in a similar manner to that occurring in the apparatus of Fig. 13.

Figure 16:
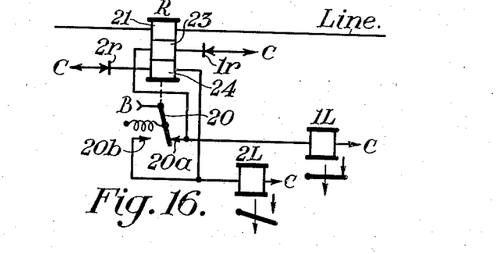

In Fig. 16 I have shown a further modification of the apparatus of Fig. 13. In apparatus of this character, contacts such as 20 of the line relays R will usually be employed to control various relays such, for example, as 1L and 2L shown in the drawing, and in order to prevent sparking when either contact 20a or 20b opens, a rectifier such as 1r or 2r is usually connected across the terminals of the respective relays 1L and 2L to provide a discharge path for their stored inductive energy when the respective energizing circuits are opened. In Fig. 16, the line relay R is provided with two auxiliary windings 23 and 24 which are connected in series in the discharge paths of the respective relays 1L and 2L, whereby the stored inductive energy of these relays is rendered available to provide impulses for accelerating the motion of contact 20. Such windings 23 and 24 are inductively coupled with the line winding 21, it will be obvious that these impulses are impressed upon the line circuit as in the other forms of the invention.

Figure 17:
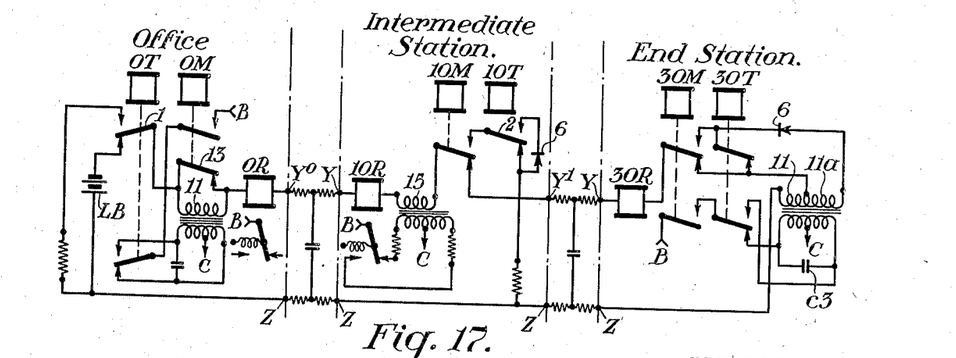
Fig. 17 is a diagrammatic view embodying my invention and showing a complete line circuit in which an office and an intermediate station, similar to the office and station of Figs. 8 and 14, respectively, are combined with an end station similar to that of Fig. 8 but of somewhat simplified form.

Fig. 17 illustrates another manner in which apparatus embodying my invention may be advantageously employed. In this view, the control office apparatus includes an impulse transmitter similar to that shown in Fig. 8, and this transmitter delivers control codes to the line circuit branch which includes back contacts of the various relays M and the windings of all the line relays R. The impulses which are delivered by this office transmitter are reenforced by apparatus similar to that shown in Fig. 13. Furthermore, the impulses which are delivered by transmitting relays, such as relay 1OT, located at relatively short distances from the office are also reenforced by apparatus such as that shown in Fig. 13, which apparatus may be located at one or more of the intermediate stations. However, the impulses which are delivered from the more remote stations such as the end station 30 and which are subject to greater distortion are further reenforced by impulse transmitting apparatus which may take the form of Fig. 6 or, if still stronger impulses are desired, of Fig. 8. The latter form of apparatus is shown at the end station of Fig. 17.

From the foregoing description of the apparatus embodying my invention it will be apparent that I have provided novel and improved apparatus for materially extending the maximum distance over which satisfactory transmission of code signals over line circuits having relatively large distributed capacity may be effected. Moreover, by decreasing undesirable distortion of the received impulses, the apparatus embodying my invention renders the operation of the receiving equipment more positive, decreases the amount of power which must be transmitted over the line, and materially increases the speed of transmission.

It will be apparent, of course, that the apparatus and method herein described of reducing the distortion effect, although applied specifically to a centralized traffic control system in railway signaling for purposes of illustration and to provide a better understanding of my invention, are not limited to this particular use but may be used for improving transmission of code impulses in long cable circuits generally.

Although I have herein shown and described only a few forms of remote control systems embodying my invention, it is understood that various changes and modifications may be made therein within the scope of the appended claims without departing from the spirit and scope of my invention.

Having thus described my invention, what I claim is:

1. In combination with a normally closed line circuit having relatively high electrostatic capacity, a source of current included in said line circuit at one end thereof, a biased polar receiving relay included in said line circuit at each end thereof, a transmitting relay at said one end for impressing unidirectional code current impulses from said source on said line circuit to operate both said receiving relays, and a shunt for said line circuit closed by said transmitting relay during the intervals between individual impulses of said code for discharging the energy stored in the line circuit in the reverse direction through the receiving relay at the same end of the line circuit to thereby decrease distortion of the code impulses received by the receiving relay at the distant end of the line circuit.

2. Apparatus for transmitting code signals in either direction over a normally closed line circuit having relatively high electrostatic capacity comprising, in combination, a first and a second transmitting relay at one and the other end respectively of said line circuit; a first source of current, a back contact of said first transmitting relay, and a biased polar receiving relay all included in said line circuit at said one end thereof; a shunt at said one end of the line circuit including a front contact of said first transmitting relay, a biased polar receiving relay included in said line circuit at said other end thereof, a second source of current at said other end of the circuit, means including a front contact of said second transmitting relay for connecting said second source into said line circuit, said second source being poled in the same direction as said first source, and means including a back contact of said second transmitting relay for shunting the line circuit at said other end thereof.

3. In combination with a line circuit having relatively high electrostatic capacity, a source of unidirectional current for energizing said line circuit at one end thereof, a receiving relay at said one end energized from said line circuit, a transmitting relay at the other end of said line circuit for transmitting code impulses to said receiving relay, a source of impulse current and a rectifier at said other end of the line circuit, and means controlled by said transmitting relay for alternately closing a shunt across said line circuit to thereby transmit code impulses to said receiving relay and for supplying a charge to said line circuit from said impulse source through said rectifier during the intervals between said code impulses, said charge being of the same relative polarity as supplied from said source of unidirectional current.

4. In combination with a normally closed line circuit having relatively high electrostatic capacity, a source of unidirectional current and a biased polar receiving relay both included in said line circuit at one end thereof, a transmitting relay at the other end of said line circuit for transmitting code impulses to said receiving relay, an auxiliary source of periodically reversed current and a rectifier at said other end of the line circuit, means controlled by said transmitting relay for shuting said line circuit to thereby transmit code impulses to said receiving relay, and means also controlled by said transmitting relay effective during the intervals between code impulses for applying a charge to said line from said auxiliary source through said rectifier, the rectifier being poled in such direction that said charge is of the same relative polarity as supplied from said source of unidirectional current.

5. Apparatus for improving the code transmission characteristics of a line circuit having relatively high electrostatic capacity comprising, in combination with a source of current and a receiving relay for said line circuit, an impulse transformer having an input and an output winding, a transmitting relay, means controlled by said transmitting relay for transmitting code impulses from said source to said receiving relay, and means also controlled by said transmitting relay effective during intervals between individual ones of said code impulses for energizing the input winding of said impulse transformer and applying a charge to said line circuit from said output winding to thereby decrease distortion of the code impulses received by said receiving relay.

6. Apparatus for transmitting code signals in either direction over a normally closed line circuit comprising, in combination, a first and a second transmitter at one and the other end respectively of said line circuit, a first source of current included in the line circuit at said one end thereof, a second source of current at said other end of the line circuit, a biased polar receiver at each end of the line circuit controlled by current impulses transmitted over said line circuit, means controlled by said first transmitter for alternately transmitting current impulses from said first source over the line circuit to control both of said receivers and shunting the line circuit at said one end thereof between individual impulses of said current, and means controlled by said second transmitter for alternately connecting said second source into the line circuit and shunting the line circuit at said other end thereof.

7. In combination with a line circuit, a source of unidirectional current for energizing the line circuit at one end thereof, a receiver at said one end controlled by current impulses transmitted over said line circuit, a transmitter at the other end of the line circuit, a source of impulse current and a rectifier at said other end of the line circuit, and means controlled by said transmitter for alternately closing a shunt across the line circuit to thereby transmit code impulses to control said receiver and supplying a charge to the line circuit from said impulse source through said rectifier during intervals between said code impulses, said charge being of the same relative polarity as supplied from said source of unidirectional current.

8. In combination with a line circuit, a source of unidirectional current and a receiving relay both included in said line circuit at one end thereof, a transmitting relay at the other end of said line circuit, a source of impulse current at said other end of the line circuit, and means controlled by said transmitting relay for alternately supplying current from said source of unidirectional current and from said impulse source to said line circuit in opposite directions to thereby transmit code impulses of improved wave form to said receiving relay, the current from said impulse source being supplied after each impulse of current from said unidirectional source.

9. Code transmitting apparatus for a line circuit comprising, in combination, a transmitter for impressing code impulses on said line circuit, a source of unidirectional current, an induction coil, means controlled by said transmitter for energizing said induction coil from said unidirectional source to thereby induce an alternating potential in the output winding thereof, and other means controlled by said transmitter and including a rectifier for applying said potential across said line circuit to produce a reverse current in said line circuit during the intervals between said code impulses.

10. In combination with a line circuit, a main source of unidirectional current for energizing said line circuit located at one end thereof, a receiving relay energized from said line circuit at said one end, a transmitting relay having a contact in said line circuit at the other end thereof for transmitting signals to said receiving relay, a transformer having an input and an output winding, an auxiliary source of unidirectional current, means for supplying current from said auxiliary source to the input winding of said transformer, a rectifier, means controlled by said transmitting relay for at times connecting said output winding across said line circuit through said rectifier, and means also controlled by said transmitting relay for interrupting the supply of current to said input winding whenever the transmitting relay contact in the line circuit is opened whereby a voltage impulse of the same relative polarity as said transmitted signals is impressed across said line circuit to decrease distortion of the signals transmitted to said receiving relay.

11. In combination with a line circuit, a source of unidirectional current and a receiving relay included in said line circuit at one end thereof, a transmitting relay and a transformer at the other end thereof, means controlled by said transmitting relay for shunting said line circuit to transmit code impulses from said source to said receiving relay, means for supplying unidirectional magnetization to the core of said transformer, means controlled by said transmitting relay effective during intervals between said code impulses for abruptly changing said unidirectional magnetization to thereby induce an impulse voltage in the output winding of said transformer of the same relative polarity as said code impulses, and means for applying said impulse voltage across said line circuit to decrease distortion of the impulses received by said receiving relay.

12. Code transmitting apparatus for a line circuit comprising, in combination, a transmitter for impressing code impulses on said line circuit, a source of unidirectional current, a transformer, means for energizing the input winding of said transformer from said unidirectional source, means controlled by said transmitter effective during intervals between said code impulses for abruptly changing the energization of said input winding to thereby induce an impulse voltage in the output winding of said transformer of the same relative polarity as said code impulses, and means for applying said impulse voltage across said line circuit to decrease distortion of the code impulses transmitted over said line circuit.

13. In combination with a normally closed line circuit, a source of unidirectional current and a biased polar receiving relay included in said line circuit at the receiving location, a transmitting relay and a transformer at the transmitting location, means for supplying unidirectional magnetization to the core of said transformer, means controlled by said transmitting relay for alternately shunting the line circuit to transmit code impulses from said source to said receiving relay and for abruptly changing said unidirectional magnetization to thereby induce an impulse voltage of the same relative polarity as said code impulses in the output winding of said transformer during intervals between said code impulses, and other means controlled by said transmitting relay for applying said impulse voltage across said line circuit.

14. Apparatus for transmitting code impulses in either direction over a normally closed line circuit comprising, in combination, a first and a second transmitting relay at one and the other end respectively of said line circuit, a source of unidirectional current and a first biased polar receiving relay included in said line circuit at said one end, a second biased polar receiving relay and a transformer at said other end of the line circuit, means controlled by said first transmitting relay for transmitting code impulses from said source to said second receiving relay, means for supplying unidirectional magnetization to the core of said transformer, means controlled by said second transmitting relay for alternately shunting the line circuit to transmit code impulses from said source to said first receiving relay and for abruptly changing said unidirectional magnetization to thereby induce an impulse voltage of the same relative polarity as said code impulses in the output winding of said transformer during intervals between said code impulses, and other means controlled by said second transmitting relay for applying said impulse voltage across said other end of the line circuit.

15. In combination with a transmitting and a receiving location, a normally energized line circuit connecting said locations and having relatively high electrostatic capacity, a source of current at said receiving location for energizing said line circuit, means at the transmitting location for opening and closing the line circuit at code intervals to thereby transmit code impulses of current to said receiving location, and means for impressing a voltage impulse generated locally at the transmitting location across said line circuit during intervals between individual ones of said impulses of current, said voltage impulse being of the same relative polarity as said code impulses, for charging the line capacity from said transmitting location in order to decrease code distortion in said line circuit.

16. In combination with a transmitting and a receiving location, a normally energized line circuit connecting said locations, a source of current at said receiving location for energizing said line circuit, means at the transmitting location for opening and closing the line circuit at code intervals to thereby transmit code impulses to said receiving location, and means at said transmitting location for impressing a voltage impulse of the same relative polarity as said code impulses and of relatively short duration across said line circuit during intervals between individual code impulses to improve the wave form of the code impulses received at said receiving location.

LLOYD V. LEWIS.